United States Patent
Otterbach et al.

(10) Patent No.: US 8,386,206 B2
(45) Date of Patent: Feb. 26, 2013

(54) METHOD FOR CHECKING AN INTERFACE MODULE

(75) Inventors: Jens Otterbach, Wenden (DE); Peter Taufer, Renningen (DE); Harald Tschentscher, Grossbottwar (DE); Davor Lukacic, Bodelshausen (DE); Bernhard Straub, Erligheim (DE); Michael Ulmer, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 3244 days.

(21) Appl. No.: 10/095,636

(22) Filed: Mar. 11, 2002

(65) Prior Publication Data

US 2002/0194541 A1 Dec. 19, 2002

(30) Foreign Application Priority Data

Mar. 9, 2001 (DE) .................................. 1 01 11 266

(51) Int. Cl.
*G06F 11/00* (2006.01)
(52) U.S. Cl. ........................................................ 702/122
(58) Field of Classification Search .................. 702/122, 702/123, 116, 117
See application file for complete search history.

(56) References Cited

U.S. PATENT DOCUMENTS

| | | | | |
|---|---|---|---|---|
| 4,207,687 A | * | 6/1980 | Haas et al. | 434/49 |
| 4,556,953 A | * | 12/1985 | Caprio et al. | 710/301 |
| 4,752,869 A | | 6/1988 | Miller et al. | |
| 5,774,703 A | * | 6/1998 | Weiss et al. | 713/501 |
| 6,151,689 A | * | 11/2000 | Garcia et al. | 714/49 |
| 6,281,632 B1 | * | 8/2001 | Stam et al. | 315/82 |
| 6,547,884 B1 | * | 4/2003 | Crum et al. | 118/706 |
| 6,671,748 B1 | * | 12/2003 | Cole et al. | 710/8 |
| 2002/0082725 A1 | * | 6/2002 | Dute et al. | 700/51 |
| 2002/0108006 A1 | * | 8/2002 | Snyder | 710/100 |

FOREIGN PATENT DOCUMENTS

| | | |
|---|---|---|
| DE | 2 130 917 | 12/1971 |
| DE | 200 00 438 | 4/2000 |
| JP | 64-048156 | 2/1989 |
| JP | 01-094449 | 4/1989 |
| JP | 11-502795 | 3/1999 |
| WO | WO 00/46896 | 8/2000 |

* cited by examiner

*Primary Examiner* — Jonathan C Teixeira Moffat
*Assistant Examiner* — Xiuquin Sun
(74) *Attorney, Agent, or Firm* — Kenyon & Kenyon LLP

(57) ABSTRACT

A method for checking an interface module, the interface module returning to the processor, using a second data message, stored values representing sensor values, after a request for a test by a processor using a data message. Using these firm sensor values, the processor can check the functioning of the interface module and its own algorithm. A safety module, which also picks up the sensor values, also checks its functioning with them, since the safety module is a redundant hardware path to the processor and is used as a plausibility check for the release decision of means of restraint. The interface module is changed into a test mode as soon as it receives the first data message from the processor, and it then suppresses the transmission of the real sensor values which were received from connected sensors.

9 Claims, 2 Drawing Sheets

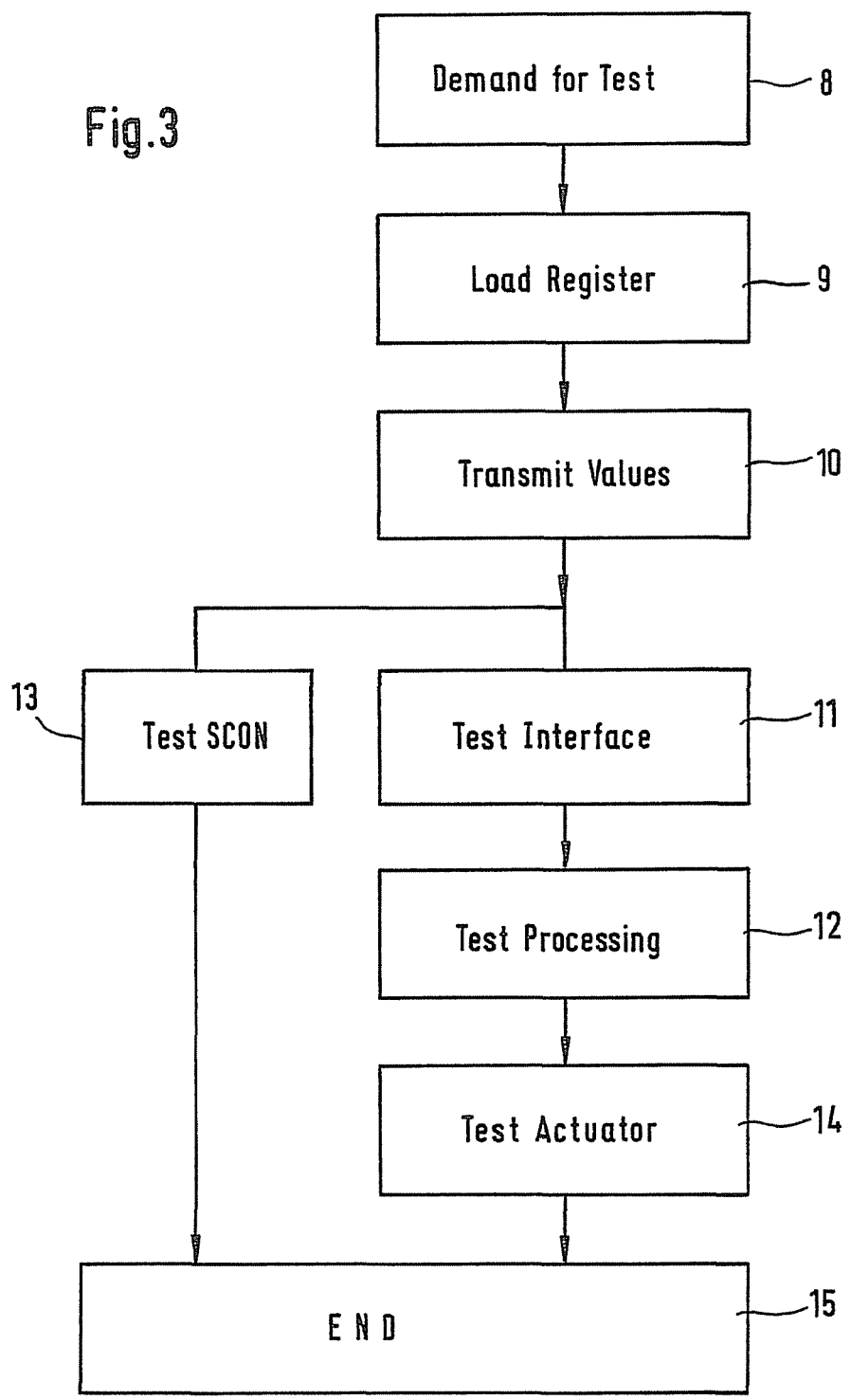

METHOD FOR CHECKING AN INTERFACE MODULE

BACKGROUND INFORMATION

It is known that, in a control device, a processor, for instance, a microcontroller checks by at least one data message the IC's present, which includes an interface module, at predefined points in time, such as when the control device is switched on.

SUMMARY OF THE INVENTION

The method according to the present invention for checking an interface module has the advantage that the interface module, during the checking process, returns permanently stored values to the processor by a further data message, and the processor then carries out the checking process of the interface module, with the aid of those values. Since these stored values emulate sensor data, namely the outer limits of the sensor values at the low end and the high end, it is thereby possible for the processor, on the one hand, to prove the operability of the interface module, and on the other hand, to check the processing of the sensor data by itself and the remaining components of the control device. For this purpose, the processor can check its algorithm with these sensor data in order to test the function for connected actuators and appertaining safety thresholds. This, then, not only checks the communication between the interface module and the processor, but also the correct processing of a sensor signal. The interface module, which is present as an IC, is checked with it, and it is also possible to test the function of a redundancy path for checking sensor signals, which perhaps may make a release decision independently of the processor.

It is especially advantageous that here the SPI (serial peripheral interface) transmission mode is used in the control device, which, on the one hand, is a synchronous transmission mode, and, on the other hand, has its own line for data transmission in each transmitting direction.

In addition, it is of advantage that the interface module is changed to a test mode by the requirement data message of the processor, and then no longer transmits the true sensor values from the sensors connected to the interface module, but suppresses them.

It is also of advantage that the device has a processor, an interface module and a safety module, the interface module being connected to both the processor and the safety module. The safety module represents the redundant hardware path for checking the sensor values with respect to release decisions. The interface module itself can be connected to sensors, the interface module then supplying the sensors with energy via these lines, while the sensors then send their data messages via the line by digital current modulation. This data transmission is asynchronous. The interface module, the safety module and the processor are positioned in a control device. This control device is advantageously connected to means of restraint, whose function can then also be checked with the emulated sensor values.

BRIEF DESCRIPTION OF THE DRAWINGS

FIG. 3 shows a flow chart of a method according to the present invention.

DETAILED DESCRIPTION

Before operational readiness, a processor in a control device has to check the connected IC's, such as an interface module, for its function. According to the present invention, the interface module now replies to such a request with values permanently stored in the interface module, which emulate sensor values. The sensor values are permanently stored in registers assigned to the interface module. With these sensor values, which the processor then receives, it is possible to check the functions of the interface module, the algorithm of the processor and, possibly, an actuator to be controlled. Beyond that, it is possible that these sensor values can also be checked by an interface module which represents a hardware-like redundancy path for the processor, and which also checks the sensor values to see whether a release decision is to be made.

Figure 1:
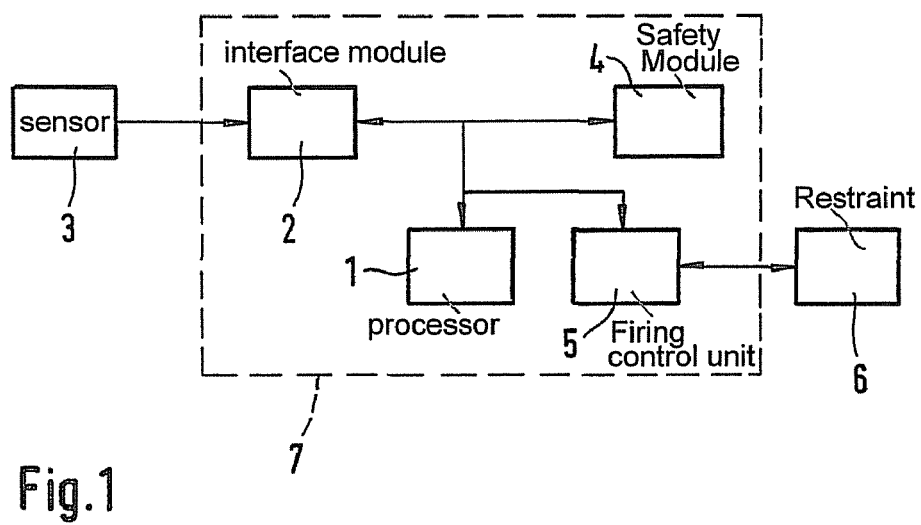
FIG. 1 shows a block diagram of the device according to the present invention.

FIG. 1 shows a device according to the present invention as a block diagram. A processor 1, an interface module 2, a safety module 4 and a firing circuit control 5 are components of a control device 7. Processor 1 is connected via a data input/output to interface module 2, safety module 4 and firing circuit control 5. Firing circuit control 5 is connected to means of restraint 6 via a second data input/output. Interface module 2 is connected to sensor 3 via a data input. It is possible for further components to be present in control device 7, and for more than one sensor to be connected to interface module 2.

Processor 1 sends data messages to the individual modules 2, 4 and 5, and receives corresponding data messages in reply. The SPI (serial peripheral interface) transmission mode is applied here.

Figure 2:
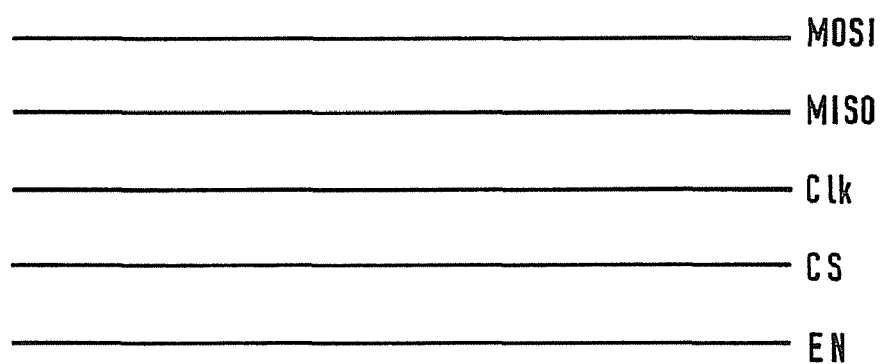
FIG. 2 shows an SPI line.

SPI (serial peripheral interface) transmission is data transmission between a master, processor 1 and several slaves, that is, the individual components in a control device such as interface module 2 according to the present invention, or firing circuit control 5, which is used for monitoring and firing the igniters for the means of restraint. The SPI transmission is a bidirectional and synchronous transmission. FIG. 2 shows an SPI line which itself has five individual lines. Because this is synchronous transmission, a timing circuit denoted as Clk is present. For data transmission from a master 1 to a slave 2, 4 or 5 there is the MOSI (master-out-slave-in) line, but for data transmission from a slave to the master, a MISO (master-in-slave-out) line is present. In order to select the appropriate slave, the CS (chip select) line is used. In order to release the SPI data transmission, an enable line, here denoted as EN, is used. The SPI line starts at master 1 and then branches out to the individual slaves 2, 4 and 5, the SPI line, however, always having the five single lines.

Processor 1 now first sends a requirement message via the SPI line to interface module 2. Interface module 2 is thereupon reset to test mode, and will then no longer transmit sensor data, which it receives in data messages from sensor 3, on to processor 1 and to safety module 4. Interface module 2 will rather transmit permanently stored test values from registers to processor 1 and safety module 4. Safety module 4 represents a hardware-like redundant checking of the sensor values, so as to ensure that, in the case of an error function of processor 1, release values for means of restraint 6 are not recognized. That is why safety module 4 must also be tested with these test values, that is, the emulated sensor values. The test sensor values represent the upper and lower boundary of the sensor values. Thus, they would force a release, but since the processor has initiated a test, there will be no such release. To this end, firing circuit control 5 is correspondingly controlled by processor 1. Processor 1 can now calculate its release algorithm using these sensor values, and can check the threshold values in the release algorithm. Safety module carries out the same procedure. Since there is an upper boundary value for the sensor data, a release decision is made by processor 1 and safety module 4, and the firing circuit control will thereupon activate means of restraint 6, but without the occurrence of a release. Thus, by the use of the emulated sensor values from the registers of interface module 2, a complete test of the processing of the sensor values in the control device is carried out.

FIG. 3 shows a flow diagram of the method according to the present invention. In method step 8, denoted as Demand for Test, processor 1 transmits to interface module 2 a data message via the SPI lines, by requesting that interface module 2 carry out a test using the register values. In method step 9, interface module 2 thereupon loads from its registers the permanently stored upper and lower boundary values of the sensor data, and resets itself into test mode, in order to suppress the current sensor data from sensor 3, and so as no longer to transmit them to processor 1. In method step 10 these values are transmitted via the SPI line from interface module 2 to processor 1 and safety module 4.

In method step 11, processor 1 now tests interface module 2 with the aid of the values received, and then also its own release algorithm. For this it uses the sensor values as input parameter for its release algorithm and checks whether a release is recognized. In method step 12 this processing is carried out. In method step 14, the control of firing circuit control 5 is checked with the release decision, and also the control of the actuator of means of restraint 6. In parallel to this, safety module 4 also tests its function. It, too, has to recognize a release, at least using the upper boundary value of the sensor values. If an error is detected during one of the tests, the function of the control device is interrupted. The method according to the present invention ends in method step 15.

What is claimed is:

1. A method for checking an interface module, comprising:
    initiating a checking by a processor by a transmission of a first data message to the interface module;
    responsive to the first data message:
        suppressing transmission, by the interface module and to the processor, of values of a sensor; and
        returning, by the interface module, in a second data message, and to the processor, values that are permanently stored in registers of the interface module and that emulate values of the sensor; and
    carrying out the checking of the interface module by the processor on the basis of the stored values.

2. The method according to claim 1, wherein the first and second data messages are transmitted synchronously.

3. The method according to claim 1, wherein the first data message is transmitted over a first line and the second data message is transmitted over a second line.

4. The method according to claim 1, wherein the stored values represent an upper and a lower boundary of sensor values.

5. The method according to claim 4, further comprising using, by the processor, the stored values for checking a processing of the sensor values.

6. The method according to claim 5, further comprising checking a function of a safety module with the aid of the stored values, the safety module being connected to the interface module.

7. A device comprising:
    a processor;
    a safety module; and
    an interface module:
        coupled to at least one sensor, the processor, and the safety module; and
        configured to transmit to the processor values from the at least one sensor; wherein:
        the processor is configured to initiate a checking of the interface module by a transmission of a first data message to the interface module;
        the interface module is configured to, in reply to the first data message, return, in a second data message, to the processor, and instead of values received by the interface module from the at least one sensor, values permanently stored in registers of the interface module, the stored values emulating values of the at least one sensor; and
        the processor is configured to carry out the checking of the interface module on the basis of the stored values received from the interface module.

8. The device according to claim 7, wherein the processor, the interface module and the safety module are situated in a control device.

9. The device according to claim 8, wherein the control device is adapted to be connected to a restraint device.

* * * * *